United States Patent Office

2,751,303
Patented June 19, 1956

2,751,303

METHOD OF RAISING BEEF CATTLE AND SHEEP AND FEED RATIONS FOR USE THEREIN

Wise Burroughs, Ames, Iowa, assignor to Iowa State College Research Foundation, Inc., Ames, Iowa, a corporation of Iowa No Drawing. Application November 9, 1955,
Serial No. 546,008

10 Claims. (Cl. 99—2)

This invention relates to a method of raising beef cattle and sheep and to feed rations for use therein. The method and feed materials of this invention have particular utility in growing and fattening beef cattle for the purpose of producing high-quality beef at an accelerated rate with a reduced amount of feed.

This application is a continuation-in-part of my copending application Serial No. 440,268, filed June 29, 1954, which in turn was a continuation-in-part of my application Serial No. 359,449, filed June 3, 1953, and now abandoned.

The present invention is concerned with the oral administration of estrogenic substances to growing beef cattle and sheep. To my knowledge no one heretofore has even tested oral administration of estrogens to growing beef cattle and sheep. The previous lack of interest in testing oral administration of estrogens in growing beef cattle and sheep has likely stemmed from discouraging results obtained with oral administration of estrogens to full grown dairy cattle. Dairy cattle require such large amounts of estrogens in their feed to bring about a desirable physiological response (e. g. increased milk production) that the practice has never been commercially feasible. It was therefore unexpected to find that the physiology of lactation and/or mammary growth in dairy cattle is sufficiently different from the physiology involving general growth and fattening in beef cattle and sheep that much lower feeding levels of estrogens are required in the case of beef cattle thereby resulting in a highly profitable feeding procedure. This finding was also unexpected because of the discouraging results previously obtained with the oral administration of estrogens to poultry and hogs.

Due to the high levels of estrogens required when given orally to poultry, swine, and dairy cattle resort has been had to the method of implanting estrogenic substances subcutaneously in the form of pellets. This method of administration when tried with growing beef cattle and lambs has not been satisfactory. While in some cases the rate of weight gain has appeared to be accelerated, in nearly all cases the meat produced is of inferior quality than when estrogenic substances are not given.

It has also been thought that the administration of estrogenic substances to growing beef cattle and sheep including castrated male cattle (steers) and both male and female lambs, suffers from a number of inherent disadvantages, chief among which is excessive sexual stimulation of animals including mammary development and lactation as well as other undesirable physiological side effects on the reproductive system. Further, when the estrogenic substances are given by subcutaneous implantation of pellets into fattening animals there is danger of residues from the pellets remaining in the meat after slaughter, which may adversely affect the health of people consuming such meat.

The problem of providing growth stimulants for meat-producing animals is particularly acute in connection with beef cattle and sheep since these animals have not proven particularly responsive to other growth stimulants such as antibiotics, vitamin $B_{12}$, surfactants, etc. Therefore, there has been a long felt need for growth stimulant compositions which are effective with beef cattle and sheep while overcoming the problems connected with the use of estrogenic substances discussed above, and for a practical commercial method of employing such compositions.

It is therefore a general object of this invention to provide a method of treating growing beef cattle and sheep to promote growth or the rate of weight gain without causing undesirable physiological side effects, and at the same time producing at least as good or superior quality meat to that produced in the absence of the treatment. Further objects and advantages will appear as the specification proceeds.

This invention is based in part on the discovery that estrogenic substances when orally administered to growing beef cattle and sheep substantially accomplish the objects of this invention and provide a solution to the problems discussed above. More specifically, it has been found that the oral administration of estrogenic substances to beef cattle and sheep is capable of producing a pronounced acceleration in the rate of weight gain in the animals without causing untoward side effects and at the same time producing better quality meat. In one of its phases, this invention is concerned with a method of treating growing beef cattle and sheep characterized by the steps of orally administering an estrogenic substance at spaced intervals of time over a substantial portion of the growth period of the animal, and regulating the quantities of the estrogenic substance thus administered to increase the rate of weight gain without causing undesirable physiological side effects. Within this range, the feed efficiency is substantially improved while at the same time down grading of the carcasses is avoided.

An estrogenic substance is defined for the purpose of this invention as any chemical substance which, when properly administered in sufficient amounts, initiates estrus in sexually mature normal female animals. Estrogenic substances can be obtained from natural sources such as animals and plants, but the commercially available estrogens are principally synthetic chemicals. Both synthetic and natural estrogens have been tested and found to be operative for the purpose of this invention, but in general synthetic estrogens are preferred. Specifically, excellent results have been obtained with stilbestrol which is a synthetic derivative of stilbene and is sometimes also referred to as diethylstilbestrol. Other natural and synthetic estrogens can be used such as estradiol, derivatives of diethylstilbestrol, estrone, dianisylhexene, genistin, genistein, dienstrol, hexestrol, and the like. A preferred sub-class of estrogens can be described as those having molecular structures similar to stilbestrol in containing two phenyl groups having free hydroxyl substituents.

While the estrogenic substance can be administered orally in other ways, it is preferred to first combine the very small quantity of the substance required with an animal feed or feed supplement which is adapted for use in feeding the particular animal, such as a cattle or sheep feed supplement. The usual practice in growing and fattening beef cattle, for example, is to feed a prepared supplement which, typically, may be about 10% by weight of the food consumed by the animals per day. These prepared feed supplements therefore provide a convenient vehicle for the administration of the estrogenic substances in accordance with this invention. However, it will be understood that if desired the estrogenic substance can be incorporated in the whole ration for the animal or in other nutrient material which is consumed by the animal.

It has been found that the quantity of the estrogenic substance which is orally administered must be regulated to increase the rate of weight gain without causing undesirable physiological side effects. In other words, it is necessary to administer enough of the estrogenic substance to produce a marked increase in the rate of weight gain but not so much as to cause undesirable physiological side effects as manifested particularly by visibly excessive sexual stimulation, or other observable effect on the reproductive system. More particularly, the physiological side effects which should be avoided in practicing this invention are indicated by undue restlessness, riding, high tail heads, marked udder development, mammary and lactation stimulation, sunken loins, rectal or vaginal prolapse, and other comparable effects on the reproductive systems of the animals.

As indicated above, the quantity of estrogenic substance administered to growing beef cattle and sheep must be controlled to produce the desired increase in the rate of weight gain as the animal matures without undesirable side effects, and the present invention is based in part on the discovery that this result can be achieved by controlling the amount of estrogenic substance administered to the animal. The necessary degree of control can be achieved by administering the estrogenic substance in proportion to the body weight of the animal or in proportion to the feed intake of the animal. In fact, both of these methods of control can produce equivalent results, since the number of pounds of food consumed daily by growing sheep and beef cattle is roughly proportional to the weight of the animal. For example, when growing beef cattle are full fed, they will usually consume about 3% of their weight per day in food material. Further, if the estrogenic substance is administered in a feed supplement which forms only part of the total ration of the animal, the amount in the supplement can be proportionaly increased in inverse relation to the proportion of the feed supplement to the total feed intake.

When stilbestrol (diethylstilbestrol) is used in practicing the present invention, from 0.1 to 8 milligrams (mgm.) should be administered to the growing beef animal per 100 lbs. of body weight during each 24-hour period of treatment, or at least the average dosage per day should fall within this range over each 5 to 10-day period of treatment. Preferably, from 0.1 to 3 mgm. of stilbestrol are administered per 100 lbs. of body weight over each 24-hour period. On the basis of feed intake, when stilbestrol is incorporated in the total feed ration, the cattle feed material should contain from .03 to 2.7 mgm. per pound of feed material or, preferably, from .03 to 1.0 mgm. per pound of feed material.

The range within which beneficial results can be obtained without also obtaining undesirable side effects tends to be somewhat lower for sheep than for cattle. Levels ranging from .01 to 5.0 mgm. of stilbestrol per 100 lbs. of body weight per 24 hours can be used for sheep, while the preferred range is the same as for beef cattle; e. g. 0.1 to 3.0 mgm. of stilbestrol per 100 lbs. of body weight per 24 hours. Similarly, when stilbestrol is incorporated in the total feed ration for the sheep, the sheep feed material can contain from .003 to 2.0 mgm. per pound of feed material and preferably contains from .03 to 1.0 mgm. per pound of feed material.

The importance of orally administering the estrogens in these specified amounts is further illustrated by the unexpected finding that estrogens when fed to beef cattle and lambs in the ranges indicated remain primarily localized in the digestive tract and liver of treated animals with only relatively minute amounts traversing the general body circulation. This finding is of considerable significance since it explains why no undesirable side effects develop in the animals when practicing the invention since at the levels indicated essentially none of the estrogen reaches the sex organs or rudimentary mammary glands. By contrast it explains why much larger amounts of orally administered estrogens are required in dairy cattle in order to be physiologically effective for stimulating lactation and mammary gland development. Since larger feeding amounts result in more estrogen traversing the general circulation to the glands concerned with milk secretion this is a desirable function in dairy cattle but undesirable in this invention for growing beef cattle in the production of high-quality beef. Further, this unique finding that the level of estrogen feeding is critical in localizing the estrogen primarily in the digestive tract is of even greater significance since it assures against possible human hazards from residual estrogen being present in the meat of treated beef cattle and sheep.

As is well known in the art, estrogenic substances vary in activity. For example, the dimethyl ether of diethylstilbestrol has been reported to be four times as active as diethylstilbestrol itself. However, the ranges set out above can be used for estrogenic substances other than stilbestrol by administering an amount of the other estrogenic substance having an activity equal to the amount of stilbestrol specified. With many estrogens a comparison of activity can be made to determine the general equivalence of estrogenic preparations as used in this invention by determining the relative potency of the estrogenic substances in stimulating uterine weight increases in immature female mice. This test procedure is described in greater detail in "Detection of estrogenic substances in alfalfa and clover hays fed to fattening lambs," by Cheng et al., Journal of Animal Science, January 1953. For certain estrogens such as those which tend to be stored in animal tissues, the cited test procedure is not necessarily valid. For such estrogens potency differences are readily apparent, however, under actual conditions of use in growing beef cattle and sheep.

By way of illustration of the method, a beef cattle or sheep feed supplement might be employed as the vehicle, composed principally of soybean meal and/or cottonseed meal and alfalfa meal, molasses, minerals and vitamins. Such supplements are referred to in the trade as protein supplements. The estrogenic substance, such as stilbestrol, can readily be incorporated in feed supplements of this type by first dissolving the estrogenic substances in a vegetable oil like cottonseed oil or soybean oil. For example, 10 grams of stilbestrol might be dissolved in 227 grams of oil. This oil solution would then be premixed with a measured amount of the feed supplement, and thereafter the premixed material would be mixed with the whole body of a measured amount of the feed supplement. For example, the above oil solution might be premixed with 9½ pounds of the supplement, and thereafter with enough of the supplement to produce a 2,000 pound batch. Such estrogen-containing supplements can be fed in various ways. However, they are preferably used as a top dressing for the usual feed rations, or mixed therewith.

Other methods of incorporating the estrogenic substance in the feed material can also be employed. Various dry mixing procedures may be desirable for producing a dry product. By way of specific example, dry diethylstilbestrol can be mixed with a dry carrier such as powdered calcium carbonate in the approximate concentration of one part diethylstilbestrol to two parts calcium carbonate to form a premix. This premix can then be mixed with a feed material like soybean oil meal in such manner that the final desired concentration is obtained.

The method of incorporating an estrogenic substance in beef cattle and sheep feed material first described above has particular advantages in practicing the present invention, since it is of importance that the estrogenic substance be evenly and completely distributed throughout the feed material, and this is difficult to accomplish because of the extremely small amounts of the estrogenic substance employed per pound of feed material and because of the insolubility of estrogenic substances in water. The preferred method admirably achieves the desired result. The estrogenic substance is soluble in the animal or vegetable triglyceride oil, and the oil solution of the estrogenic substance is absorbed by the finely-divided vegetable material. Good results are obtained by employing vegetable meals alone as the absorbent material, such as soybean meal, cottonseed meal, linseed meal, wheat bran, etc. Preferably, the vegetable meal employed is substantially free from oil, such as solvent-extracted soybean meal. The meal is then highly absorbent for the oil containing the estrogenic substance.

By the step described, a premix for incorporating an estrogenic substance in beef cattle feed material can be prepared. This premix comprises a body of finely-divided absorbent vegetable material substantially saturated with a triglyceride oil solution of an estrogenic substance. Preferably, substantially all of the oil is absorbed by the vegetable material so that there is little free oil in the body of material. This premix can then be combined with a beef cattle or sheep feed material to produce a feed material for use in practicing the present invention.

While the method of this invention is applicable generally to the fattening of growing beef cattle and sheep, particularly good results are achieved in fattening steers. This is fortunate indeed, since steers are the principal beef-producing animals in the United States.

The following examples illustrate the method and feed material of this invention in greater detail.

EXAMPLE I

Results with growing beef cattle indicate that estrogenic materials when orally administered such as in a beef cattle supplemental feed, stimulates gains in live-weight and improved efficiency in feed utilization. The present example is presented as a general directional example or guide in practicing this invention in beef cattle feeding. The estrogenic material such as stilbestrol can easily be incorporated in a cattle supplement at the time of manufacture. The amount which should be added to the cattle supplement should be approximately 10 times the amount desired in the total cattle ration since most cattle supplements in practice are fed at the rate of 10% of the total amount of feed which cattle normally consume. For example, if one wished to feed 0.03 milligram of stilbestrol per pound of total feed consumed by cattle, then 0.3 milligram should be placed in each pound of the cattle supplement. Likewise, if one wishes to feed 1.0 milligram of stilbestrol per pound of total ration consumed, then 10.0 milligrams of stilbestrol should be placed in each pound of the cattle supplement. The placing of these small quantities of materials in cattle supplements is most easily accomplished by first diluting them in a suitable solvent, for example 10 gms. of stilbestrol dissolved in 227 gms. of peanut oil. This amount of oil solution is sufficient for mixing with 1 ton of cattle supplement if one wishes to supply 5 milligrams of stilbestrol per pound of supplement. To facilitate the most uniform mixture, it is best to premix the oil solution with a small quantity, such as 9½ lbs., of one of the cattle supplement ingredients.

EXAMPLE II

Diethylstilbestrol in trace amounts was placed in the feed of fattening steers in three feeding experiments. In the first experiment, 3 lots of yearling steers were fed similar fattening rations containing several levels of diethylstilbestrol. During a 43-day feeding period these additions supplied 5 mgs., 10 mgs., and no diethylstilbestrol per steer daily in each of the respective lots. In the second experiment, 4 lots of 8 steers individually weighing about 700 pounds, were fed the following ration for 112 days: corn ad libitum, 12 pounds of silage, 2 pounds of hay, and 2 pounds of soybean oil meal per animal per day. Diethylstilbestrol was added to the soybean oil meal to provide each steer in the respective lots the following levels: none, 2.5 mgs., 5 mgs., and 10 mgs. Two lots of 8 steers each averaging initially 775 lbs. were fullfed for 111 days a mixture of approximately 65% ground shelled corn and 35% ground corncobs in the third and final experiment. Lot 1 in this experiment received a simple protein supplement (3 lbs. daily per steer) consisting of soybean oil meal with no diethylstilbestrol added. Lot 2 received a complex supplement in an amount equal to that fed to lot 1, but containing sufficient diethylstilbestrol to supply 5 mgs. per steer daily.

The feedlot behavior of the cattle receiving diethylstilbestrol was normal in every respect. This was true in each of the 3 experiments even when particular attention was focused upon characteristics which might conceivably develop from stilbestrol feeding such as restlessness, riding, high tailheads, lactation and udder development.

The more pertinent results of these experiments are presented in Table I.

*Table I*

EFFECTS OF DIETHYLSTILBESTROL IN THE RATIONS OF FATTENING STEERS

| | Mgs. Diethylstilbestrol per steer daily | | | |
|---|---|---|---|---|
| | 0 | 2.5 | 5.0 | 10.0 |
| Experiment I (43 days): | | | | |
| Av. Daily Gain, lbs | 2.13 | | 2.83 | 2.50 |
| Feed Required Per 100 lbs. gain, lbs | 1,144 | | 929 | 1,065 |
| Experiment II (112 days): | | | | |
| Av. Daily Gain, lbs | 2.23 | 2.46 | 2.64 | 3.06 |
| Feed Required Per 100 lbs. gain, lbs | 940 | 864 | 874 | 756 |
| Experiment III (112 days): | | | | |
| Av. Daily Gain, lbs | 2.33 | | 2.91 | |
| Feed Required Per 100 lbs. Gain, lbs | 978 | | 919 | |

Within each experiment these data show that incorporation of trace amounts of diethylstilbestrol in the rations of fattening steers markedly increased weight gains when compared with the performance of the animals not receiving diethylstilbestrol. In every case steers receiving diethylstilbestrol required less feed per unit of gain than comparable steers not fed this material. The financial returns from the cattle when sold showed consistently greater profits in the 3 experiments in lots receiving diethylstilbestrol as compared to lots not receiving diethylstilbestrol. This greater profit amounted to as much as $26.00 per steer in one of the experiments.

The cattle in the 3 experiments produced carcasses which graded U. S. choice to low-prime. The carcasses produced by the most rapidly gaining animals (fed diethylstilbestrol) possessed quality characteristics similar to or slightly superior to those found in carcasses from the control lot as determined by grade characteristics and the yield of lean and fat from the 9-10-1- rib sections. No residues of stilbestrol remained in the fat and muscle tissues when analyzed using bio-assay methods sufficiently critical to measure approximately one hundredth of one part per million of the hormone had it been present in the tissues.

Summarizing, the placing of trace amounts of diethylstilbestrol in the feed of fattening beef cattle increased liveweight gains as much as 35% over control animals not receiving diethylstilbestrol and reduced feed costs per unit of gain as much as 20%. Profits from beef cattle feeding were approximately doubled by using diethylstilbestrol. No reduction in the fatness of the cattle or the quality of meat produced was noted when the diethylstilbestrol was incorporated in the cattle feeds. Also no stilbestrol residues remained in the beef tissues following slaughter.

EXAMPLE III

Two additional cattle experiments were carried out to determine the influence of oral administration of diethylstilbestrol in growing beef cattle being fed high-roughage rations. The previous 3 cattle experiments described in Example II made use of high-grain growing rations. It was therefore desirable to establish whether diethylstilbestrol would exert favorable influences in high-roughage rations similar to the favorable results obtained on the high-grain rations fed to growing beef cattle.

The first high-roughage ration tested consisted of cornstalk silage fullfed with the following feeds in the rations being limited per animal daily to 5 lbs. of brome-alfalfa hay, 2 lbs. of ground ear corn, and 2 lbs. of protein supplemental feed. Ten yearling steers weighing 625 lbs. at the start of the experiment were fed this ration for 127 days and their rate and cost of gain determined for the entire feeding period. Ten similar steers were fed during the same period a similar ration to which 5 milligrams of diethylstilbestrol was incorporated in the 2 lbs. of protein supplemental feed being fed daily. The results of this experiment showed a favorableness to stilbestrol when added to the high-roughage ration similar to the good results earlier obtained when feeding high-grain rations. The cattle without stilbestrol gained 1.11 lbs. daily per head whereas the cattle receiving stilbestrol gained 1.22 lbs. daily. The feed costs of liveweight gains were reduced from 23.0¢ per lb. to 19.2¢ per pound with this small feed addition of diethylstilbestrol to the ration. No undesirable side effects such as riding, mammary development, and lactation were observed in the steer cattle at any time during this experiment.

The second high-roughage ration to which diethylstilbestrol was added consisted of approximately similar feeds to those just described except the corn grain and protein supplement fed was essentially doubled in amount such that the cattle received approximately 8 lbs. of concentrate feeds daily per animal in addition to all the roughage they would consume. Eight 625-lb. steers received this high-roughage ration for 140 days without diethylstilbestrol and 8 similar steers during the same period received a similar ration to which 5.5 milligrams of diethylstilbestrol was incorporated in the daily protein supplement allowance furnished each animal. Again a favorable response was obtained from the oral administration of stilbestrol in the high-roughage ration consumed by these growing beef cattle. Liveweight daily gains per animal were stimulated from 1.72 lbs. to 2.00 lbs. by the stilbestrol addition in the feed. Costs of gains were reduced by 18%. No undesirable effects attributable to diethylstilbestrol feeding were noted in the cattle at any time.

EXAMPLE IV

It appeared desirable to test the value of oral administration of diethylstilbestrol in different types of beef cattle and see if similar good results could be obtained as noted when stilbestrol was included in different types of cattle rations. Accordingly two further beef cattle experiments were conducted with feeding diethylstilbestrol. One experiment made use of heavy weight steers weighing between 1000 and 1300 lbs. per animal. In the second experiment beef heifers were used weighing initially 640 lbs. on the average. In all previous experiments described in Examples II and III, steers were used weighing from 625 lbs. to 775 lbs. initially per animal.

Two lots of 10 animals each of heavy weight steers were fullfed a high corn ration, limited hay, and protein supplemental feed over an 84-day period. One lot received no stilbestrol while the other lot received stilbestrol in the protein supplemental feed at a level such that each steer received 9 milligrams of hormone daily. Liveweight daily gain per animal was stimulated from 2.32 lbs. to 2.95 lbs. by the stilbestrol feed addition. Feed cost per lb. of liveweight gain was reduced from 22.3¢ down to 17.5¢, thus indicating the profitableness of adding diethylstilbestrol to heavy weight growing beef cattle. The cattle in the feedlot showed no untoward effects from diethylstilbestrol feeding. They sold well on the market and their carcasses proved to be slightly superior to carcasses from animals not receiving diethylstilbestrol in their feed. No detectable stilbestrol residue remained in the meat when analyzed critically in the laboratory. The only place where diethylstilbestrol residues were present were within the contents of the digestive tract and in the bile emptying into the digestive tract. This finding is in direct contrast to the results reported by others with subcutaneous injection of stilbestrol pellets which leaves behind stilbestrol residues throughout the meat tissues of cattle.

In the last cattle experiment, growing beef heifers were tested with respect to their responsiveness to feeding diethylstilbestrol. One lot of 8 heifers weighing initially 640 lbs. was fed for 112 days a high grain growing ration to which no diethylstilbestrol was added. Two additional lots of 8 heifers each were fed during the same 112 days similar rations except for stilbestrol additions to the feed. The stilbestrol additions in the two lots were at the respective rates of 6 and 12 milligrams per heifer daily. Liveweight gains were stimulated in the heifers similar to the stimulation noted with steers. This stimulation amounted to about 20% or an additional third of a lb. gain each day a heifer was fed stilbestrol. Feed costs of gains were reduced and the profitableness of cattle feeding thereby increased substantially.

No undesirable side effects such as udder development occurred in the heifers at any time. The beef carcasses produced were of excellent quality. Also no stilbestrol residues were found in the meat tissues. The only residues being present were confined to the contents of the digestive tract and to the bile of the liver.

During the winter months of 1951-52 two lots of 20 western feeder lambs each were fed for 78 days a fattening ration composed of 56 parts shelled corn, 40 parts mixed clover hay and 4 parts soybean oil meal. This ration was characterized further as containing the estrogenic material (genistein) equivalent to 1 microgram of stilbestrol per pound of ration. The lambs made exceedingly good gains in body weight (average .45 lb. per lamb daily) as compared to lamb gains of approximately .33 lb. when fed this same type of ration without estrogenic activity. Two additional lots of lambs were injected with stilbestrol pellets (two 15 mg. pellets per lamb) in addition to the above ration containing genistein in an effort to determine whether the genistein was 100% effective in stimulating maximum weight gains in lambs. These lambs receiving stilbestrol injected failed to gain faster than the lambs without stilbestrol pellets, indicating that the genistein orally administered in the feed was 100% effective.

EXAMPLE V

A second lamp experiment was carried out during the summer months of 1952 which was essentially a duplication of the above experiment. Again genistein orally administered in the hay consumed by lambs proved just as effective in stimulating gains in fattening lambs as did further administration of stilbestrol pellets.

EXAMPLE VI

During the fall of 1952 the oral administration of genistein was further tested with respect to its ability to stimulate growth in lambs and its ability to bring about improvement in the lamb meat being produced. Since much difficulty and expense were involved in securing a supply of genistein, which had to be extracted from a special supply of hay with pure ethyl alcohol, only a limited number of lambs (8) were used in this experiment. Great care was taken in obtaining lambs of uniformity with respect to breeding, size, fleshiness and previous feeding history. The 8 lambs selected were placed in individual feeding pens and allowed free access to all the feed and water they would consume throughout a 63-day feeding period. Four of the lambs received the following basal feed mixture: Coarsely ground hay 50.00%, cracked corn 32.63%, cane molasses 15.00%, protein and mineral supplement 2.37%. The other four lambs received a similar feed mixture to which 8 grams of genistein was added per 100 lbs. of feed mixture. The genistein was incorporated in the mixture by first mixing it with the molasses and then mixing the molasses with other ingredients. This ration thus compounded contained 2 stilbestrol units per pound.

The four lambs receiving the basal mixture each made an average daily liveweight gain of .33 of a pound during the 63-day feeding period. The lambs receiving the genistein gained 12% faster or .37 of a pound daily during the same period.

Each of the 8 lambs fed were slaughtered immediately at the close of the feeding experiment. Dressing percentage averaged slightly higher in the genistein-fed group than in the control group, indicating more edible meat was produced with the use of genistein.

The edible meat was studied in detail by taking a 3-rib cut from each lamb carcass. Separation of this 3-rib cut into 3 fractions namely fat, lean, and bone, indicated that somewhat more lean meat was produced from the genistein-fed animals and substantially more fattening occurred where this estrogenic substance was fed. The average fat percentage of the 3-rib cut from the basal group of carcasses was 34.5 whereas the comparable figure for the genistein carcasses was 43.9%.

The results of this experiment can be summarized by saying the estrogenic substance genistein caused lambs to gain faster, to produce more edible and salable meat, and meat of higher quality as judged by degree of fatness.

EXAMPLE VII

In a companion experiment to the experiment presented in Example VI, 8 lambs were selected and fed in the same manner as described above except stilbestrol (1.5 micrograms per lb.) was used in the second ration instead of genistein. The stilbestrol was incorporated in the ration by first dissolving the pure chemical in peanut oil such that 1 gm. of oil contained 0.01 mg. of stilbestrol. The oil solution was then mixed in the total ration to supply the desired amount of stilbestrol.

At the end of a 70-day feeding period the lambs receiving stilbestrol gained 40% faster than the lambs receiving no stilbestrol. The average daily gains of the 2 groups were .48 and .34 lbs. respectively. Upon slaughtering the lambs immediately at the close of the experiment dressing percentage was higher in the stilbestrol-fed lambs (52.8%) as compared with (50.9%) for the basal lambs receiving no stilbestrol.

In summary, the results of this experiment demonstrated that stilbestrol when orally administered not only stimulated gain in liveweight markedly, but resulted in higher dressing percentage indicating more salable meat produced and meat of higher quality.

EXAMPLE VIII

During the spring of 1953 twenty-eight lambs were employed in testing the most effective levels of orally administering stilbestrol in lamb feeds. Four lambs were fed a basal ration mixture composed of 50 parts ground clover hay, 38 parts ground corn, 10 parts molasses and 2 parts minerals with urea. This basal mixture contained no stilbestrol. A second group of 4 lambs received the basal mixture to which was added 1.5 micrograms of stilbestrol per lb. of mixture. The third group received 3.0 micrograms of stilbestrol per lb. of ration, the fourth group received 6.0 micrograms, and the fifth group of 4 lambs received 12.0 micrograms of stilbestrol per pound of the basal mixture.

The sixth group of 4 lambs received stilbestrol by another method of administration, namely, by implantation of a 15 mg. stilbestrol pellet under the skin of each lamb at the beginning of the feeding period. The purpose of this group was to compare the implantation method of stilbestrol administration with the method of oral administration.

The seventh and final lot of 4 lambs received the basal feed mixture to which 0.2 gm. of genistin was added per pound of final mixture. This genistin amounted to 4 units of stilbestrol per pound of ration. The genistin used was extracted from soybean oil meal and purified to a high degree of purity.

The gains made by all the lambs on the various treatments were considered good for the 42-day feeding trial. The lambs receiving the lower levels of stilbestrol in their respective ration, however, gained significantly more than the lambs receiving no stilbestrol. The average daily gains were as follows:

| | Pounds |
|---|---|
| Lot 1—Basal—no stilbestrol | .46 |
| Lot 2—1.5 mcg. stilbestrol per lb. ration | .58 |
| Lot 3—3.0 mcg. stilbestrol per lb. ration | .53 |
| Lot 4—6.0 mcg. stilbestrol per lb. ration | .49 |
| Lot 5—12.0 mcg. stilbestrol per lb. ration | .40 |
| Lot 6—Stilbestrol pellet | .40 |
| Lot 7—Genistin (4 stilbestrol) | .53 |

As in the case of Example VII, the best gaining stilbestrol-fed lot gained approximately 40% faster than the group of lambs on the basal ration containing no stilbestrol. The lambs receiving the stilbestrol pellet failed to gain as much as the control lambs. These pelleted lambs showed undesirable side effects, namely, increased sexual characteristics. The lambs receiving genistin in their feed gained significantly more than the control lambs and approximately the same amount as lambs getting an equivalent amount of estrogenic substances in the form of stilbestrol.

Removal of the 3-rib sections from each of the lambs after slaughter revealed that the lambs receiving either form of estrogen (stilbestrol or genistin) had superior meat carcasses carrying a better degree of fatness when compared to the control lambs receiving no estrogenic material in their feeds.

While of course there is some variation from animal to animal in regard to the response obtained by treating the animal in accordance with the method of this invention, it can be stated generally that increases with beef cattle and sheep in the rate of weight gain of the order of 10 to 30% are usual. It has been found, as indicated above, that not only does the method of this invention increase the rate of weight gain of the animal but also that the meat produced is of as good or better quality. One indication of this is that the meat tends to contain more fat and that the fat is better distributed. Further, animals fattened in accordance with this invention provide a greater dressed weight of salable meat for the same feeding period. Summarizing, the method of this invention provides a means for producing more beef and sheep meat in the same time with a reduced amount of feed without impairing the quality of meat.

While in the foregoing specification this invention has been described in considerable detail and specific embodiments thereof have been set forth, it will be apparent to those skilled in the art that this invention is subject to other embodiments and that many of the specific details set forth can be varied considerably without departing from the basic concepts of the invention.

I claim:
1. The method of growing and fattening meat-producing animals selected from the class consisting of immature beef steers, immature non-lactating beef heifers, and immature sheep, comprising orally administering an estrogenic substance to said animals at spaced intervals of time, and regulating the quantities of said estrogenic substance administered to said animals to accelerate the rates of weight gain of said animals but without appreciably affecting their reproductive systems, whenever the animals selected from said group are heifers said heifers remaining free from milk secretions throughout the course of said administration, the amount of said estrogenic substance administered to said animals when said animals are said steers and when said animals are said heifers having an activity ranging from about 0.1 to 8 milligrams of diethylstilbestrol per 100 pounds of body weight per 24 hours, the amount of said estrogenic substance administered to said animals when said animals are said sheep having an activity ranging from about 0.01 to 5.0 milligrams of diethylstilbestrol per 100 pounds of body weight per 24 hours, whereby more beef and sheep meat can be produced in the same time with a reduced amount of feed without impairing the quality of the meat.

2. The method of claim 1 in which said estrogenic substance is diethylstilbestrol.

3. The method of claim 1 in which said estrogenic substance is a synthetic estrogen having a molecular structure including two hydroxyphenyl groups.

4. The methd of claim 1 in which said animals are immature steers.

5. The method of growing and fattening meat-producing animals to produce more meat in the same time with a reduced amount of feed without impairing the quality of the meat, said animals being selected from the class consisting of immature steers, immature non-lactating beef heifers, and immature sheep, comprising orally administering an estrogenic substance to said animals at spaced intervals of time over substantial portions of their growth periods, regulating the quantities of said estrogenic substance administered to said animals to accelerate the rates of weight gain of said animals but without appreciably affecting their reproductive systems, the amount of said estrogenic substance administered to said animals when said animals are said steers and when said animals are said heifers having an activity ranging from about 0.1 to 8 milligrams of diethylstilbestrol per 100 pounds of body weight per 24 hours, the amount of said estrogenic substance administered to said animals when said animals are said sheep having an activity ranging from about 0.01 to 5.0 milligrams of diethylstilbestrol per 100 pounds of body weight per 24 hours, and thereafter slaughtering said animals to obtain their meat-providing carcasses.

6. The method of growing and fattening immature beef cattle, comprising orally administering a synthetic estrogenic substance to said beef cattle at spaced intervals of time over substantial portions of their growth periods, regulating the quantities of said estrogenic substance administered to said beef cattle to accelerate the rates of weight gain of said beef cattle but without appreciably affecting their reproductive systems, the amount of said estrogenic substance administered over each 24 hour period per 100 pounds of body weight having an activity ranging from about 0.1 to 8 milligrams of diethylstilbestrol, and thereafter slaughtering said beef cattle to obtain their meat-providing carcasses, whereby more feed meat can be produced in the same time with a reduced amount of feed without impairing the quality of the meat.

7. A method of growing and fattening immature sheep, comprising orally administering a synthetic estrogenic substance to said sheep at spaced intervals of time over substantial portions of their growth periods, regulating the quantities of said estrogenic substance administered to said sheep to accelerate the rates of weight gain of said sheep but without appreciably affecting their reproductive systems, the amount of said estrogenic substance administered over each 24 hour period per 100 pounds of body weight having an activity ranging from about 0.01 to 5.0 milligrams of diethylstilbestrol, and thereafter slaughtering said sheep to obtain their meat-providing carcasses, whereby more sheep meat can be produced in the same time with a reduced amount of feed without impairing the quality of the meat.

8. The method of growing and fattening meat-producing animals selected from the class consisting of immature beef steers, immature non-lactating beef heifers, and immature sheep, comprising mixing a quantity of a synthetic estrogenic substance with a feed material for said animals, feeding portions of the resulting mixture to said animals at spaced intervals of time over substantial portions of their growth periods, regulating the amounts of said mixture fed to said animals to accelerate the rates of weight gain of said animals but without appreciably affecting their reproductive systems, whenever the animals selected from said group are heifers said heifers remaining free from milk secretions throughout the course of said feeding, the amount of said estrogenic substance fed to said animals having an activity ranging from about 0.1 to 3 milligrams of diethylstilbestrol per 100 pounds of body weight per 24 hours, and thereafter slaughtering said animals to obtain their meat-providing carcasses.

9. The method of claim 8 in which said estrogenic substance is diethylstilbestrol.

10. The method of using diethylstilbestrol for the treatment of beef cattle to produce more beef meat in the same time with a reduced amount of feed without impairing the quality of the meat, comprising dissolving a measured quantity of diethylstilbestrol in a triglyceride oil to obtain said measured quantity in a definite volume of solution, mixing said definite volume of solution with a predetermined amount of an edible vegetable material, said vegetable material being in a finely-divided absorbent condition and said predetermined amount being sufficient to absorb said solution, continuing said mixing until said solution has been uniformly distributed throughout and absorbed by said vegetable material, thereby obtaining a premix of known diethylstilbestrol content which is especially adapted for oral administration to beef cattle, mixing said premix with a larger established quantity of a beef cattle protein feed supplement, and feeding said supplement to beef cattle in such amounts that said beef cattle receive about 0.1 to 3 milligrams of diethylstilbestrol per 100 pounds of body weight per 24 hours.

References Cited in the file of this patent

UNITED STATES PATENTS

| | | |
|---|---|---|
| 2,541,447 | Turner et al. | Feb. 13, 1951 |
| 2,589,898 | Turner | Mar. 18, 1952 |

OTHER REFERENCES

Lewis et al.: Jr. of Dairy Science, vol. 25, 1942, pages 895–907.

Folley et al.: Jr. of Endocrinology, June 1944, vol. 4, pages 24–36.

Andrews et al.: Mimeo. No. A. H. 46, Indiana Agri. Exp. Sta., April 21, 1950, two pages.

UNITED STATES PATENT OFFICE

CERTIFICATE OF CORRECTION

Patent No. 2,751,303 June 19, 1956

Wise Burroughs

It is hereby certified that error appears in the printed specification of the above numbered patent requiring correction and that the said Letters Patent should read as corrected below.

Column 6, line 55, for "9-10-1-" read -- 9-10-11 --; column 11, line 58, for "feed" read -- beef --.

Signed and sealed this 14th day of August 1956.

(SEAL)
Attest:

KARL H. AXLINE
Attesting Officer

ROBERT C. WATSON
Commissioner of Patents

UNITED STATES PATENT OFFICE

CERTIFICATE OF CORRECTION

Patent No. 2,751,303  June 19, 1956

Wise Burroughs

It is hereby certified that error appears in the printed specification of the above numbered patent requiring correction and that the said Letters Patent should read as corrected below.

Column 6, line 55, for "9-10-1-" read -- 9-10-11 --; column 11, line 58, for "feed" read -- beef --.

Signed and sealed this 14th day of August 1956.

(SEAL)
Attest:

KARL H. AXLINE
Attesting Officer

ROBERT C. WATSON
Commissioner of Patents